us009030975B2

(12) United States Patent
Wang et al.

(10) Patent No.: US 9,030,975 B2
(45) Date of Patent: May 12, 2015

(54) METHOD AND APPARATUS FOR SCHEDULING DOWNLINK TRANSMISSION (75) Inventors: Gang Wang, Beijing (CN); Zhennian Sun, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 97 days.

(21) Appl. No.: 13/702,918

(22) PCT Filed: Dec. 20, 2010

(86) PCT No.: PCT/CN2010/002103
§ 371 (c)(1),
(2), (4) Date: Feb. 19, 2013

(87) PCT Pub. No.: WO2012/083483
PCT Pub. Date: Jun. 28, 2012

(65) Prior Publication Data
US 2013/0142091 A1 Jun. 6, 2013

(51) Int. Cl.
*H04J 1/00* (2006.01)
*H04W 72/08* (2009.01)
*H04L 5/00* (2006.01)
*H04W 72/12* (2009.01)
*H04W 72/04* (2009.01)

(52) U.S. Cl.
CPC ........... *H04W 72/085* (2013.01); *H04L 5/0037* (2013.01); *H04W 72/0453* (2013.01); *H04W 72/1231* (2013.01)

(58) Field of Classification Search
CPC .................. H04W 72/085; H04W 72/1231
USPC .................................................. 370/281, 329
See application file for complete search history.

(56) References Cited

U.S. PATENT DOCUMENTS

2009/0069054 A1    3/2009   Zangi et al.
2012/0188976 A1*   7/2012   Kim et al. .................... 370/329

FOREIGN PATENT DOCUMENTS

CN    101064865 A    10/2007
CN    101478786 A     7/2009
CN    101631355 A     1/2010
(Continued)

OTHER PUBLICATIONS

International Search Report for PCT/CN2010/002103 dated Oct. 20, 2011.
(Continued)

*Primary Examiner* — Sai-Ming Chan
(74) *Attorney, Agent, or Firm* — Sughrue Mion, PLLC (57) ABSTRACT

The present invention relates to method and apparatus for scheduling downlink transmission. According to an embodiment of the present invention, a method for scheduling downlink transmission in a wireless communication system is provided. The method comprises: scheduling, in a channel measurement sub-frame, user equipments in a cell according to feedback information that was most recently received from the user equipments, wherein in the channel measurement sub-frame, the user equipments calculate feedback information to be reported; and scheduling, in response to receipt of the feedback information, the user equipments based on a result of scheduling corresponding to the channel measurement sub-frame. According to an embodiment of the present invention, there is also provided a scheduling apparatus, base station device and corresponding computer program product.

16 Claims, 6 Drawing Sheets

(56) References Cited

FOREIGN PATENT DOCUMENTS

| | | |
|---|---|---|
| JP | 2009-303077 A | 12/2009 |
| JP | 2010-233202 A | 10/2010 |
| JP | 2010-273073 A | 12/2010 |
| WO | 2009/072191 A1 | 6/2009 |
| WO | 2010/006474 A1 | 1/2010 |

OTHER PUBLICATIONS

Office Action, dated Nov. 26, 2013, issued by the Japanese Patent Office, in counterpart Application No. 2013-516946.

* cited by examiner

METHOD AND APPARATUS FOR SCHEDULING DOWNLINK TRANSMISSION

CROSS REFERENCE TO RELATED APPLICATIONS

This application is a National Stage of International Application No. PCT/CN2010/002103 filed Dec. 20, 2010, the contents of which are incorporated herein by reference in their entirety.

TECHNICAL FIELD

The present invention generally relates to a communication system, particularly to a method and apparatus for scheduling downlink transmission in a wireless communication system.

DESCRIPTION OF THE RELATED ART

The Third Generation Partnership Project (3GPP) Standard for Long Term Evolution (LTE)/LTE-Advanced (LTE-A), also known as the evolution standard of the great success of GSM/HSPA technology, is aiming at creating a new series of specifications for the new evolving radio-access technology. One of its goals is to improve the cellular communication system performance, such as higher throughput and low packet transmission latency. The LTE/LTE-A system has incorporated quite a number of new technologies. For example, the LTE/LET-A physical layer (PHY) is based on MIMO-OFDM technology, which offers spatial multiplexing gain and good resistance to the multi-path interference and allows the LTE/LET-A system to operate in the non-line-of-sight conditions.

In the LTE/LTE-A system, the radio resource could be divided into three dimensions, namely, time, frequency and spatial dimensions. The time and frequency domain resource structure is formed by OFDM symbols and sub-carriers. In the LTE/LTE-A system, a radio frame lasts 10 ms, which is further subdivided into ten 1 ms sub-frames. In the frequency domain, the whole OFDM bandwidth is divided into many sub-carriers, and 1 sub-carrier plus 1 OFDM symbol is called a resource element which is the smallest radio resource unit. 12 sub-carriers are grouped into a resource block which takes the duration of one slot. And a few resource blocks are bonded together to form a sub-band, which is the minimum resource allocation unit for a user equipment (UE) to carry out data transmission.

In a typical multi-cell LTE/LTE-A system, there are several cells in the system. The UEs send or receive data from the base stations (e.g., eNBs) through their wireless interface. The eNBs are connected to an evolved packet core (EPC), which belongs to the core network.

A typical single cell LTE/LTE-A system may contain a number of UEs communicating with one eNB over the sub-bands allocated by the eNB.

Each UE receives data symbol and reference signal sent by the eNB. Based on the received symbol and reference signal, the UE calculates the feedback information, including channel quality indication (CQI), precoding matrix indicator (PMI) and ACK/NACK. When the feedback is calculated, the UE will transmit it to the eNB through a physical uplink control channel (PUCCH) or a physical uplink shared channel (PUSCH). Typically, there are some delays between the time when the UE completes the feedback calculation and the time when the eNB receives this feedback. For example, the delay would be 6 ms.

The eNB applies some scheduling algorithms to allocate the time/frequency/spatial resource to multiple UEs in order to optimize a set of performance metrics, for example average throughput/delay/fairness. When the time/frequency/spatial resource has been scheduled to the UEs, the eNB maps the UEs' data to the allocated resource (time and frequency) and the eNB will send the UEs' data in the next sub-frame.

However, due to delay of the feedback information from the UEs, the feedback information is not accurate at all when the eNB allocates resource to multiple UEs.

Figure 1:
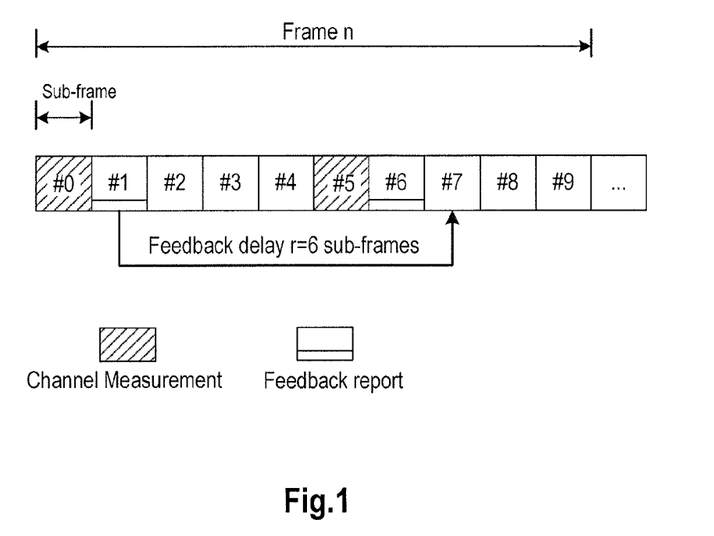
FIG. 1 shows a typical radio frame of the LTE/LTE-A system, which contains 10 sub-frames.

FIG. 1 shows a typical radio frame of the LTE/LTE-A system, which contains 10 sub-frames. At the channel measurement sub-frames 0 and 5, the UE calculates the feedback information according to the reference signal or the data symbols downlink transmitted by the eNB. In the sub-frames 1 and 6, it reports the calculated feedback information to the eNB. But due to transmission delay and processing delay in both sides, the delayed feedback information that was calculated in the sub-frame 0 is available in the eNB in the sub-frame 7. Starting at the sub-frame 7, the eNB uses the reported feedback information to allocate the resource until the next feedback comes. However, this feedback information is calculated by the UE at the sub-frame 0, in which the UE is scheduled by the eNB based on the previous feedback information. Therefore, the feedback information does not match the actual channel information.

To reduce the temporal variations in the interference perceived by the UEs operating in such a wireless communication system, US Patent Application Publication No. US2009/0069054A1 provides a solution which is based on maintaining fixed linear precoding settings at each eNB in a plurality of the eNBs over a super-frame interval. In this prior art solution, the eNB should allocate the precoded radio resource to multiple UEs with the precoding information, which is reported in UE's feedback (e.g., precoding matrix indicator (PMI)). The precoding information in each sub-carrier is fixed during a whole frame. That is to say, the eNB, at sub-frame 0, allocates the radio resource to multiple UEs based on the previously received feedback from the UE; the precoding matrix in each sub-carrier as allocated remains unchanged over the frame length and could be changed only when the next frame starts.

However, even the precoding information in each sub-carrier/sub-band is kept unchanged during a frame, because of feedback delay, the feedback information is accurate only with respect to a part of the sub-frames. It is apparent that the UE's feedback information is reliable in the sub-frames 7 to 9 of the radio frame n, as the eNB actually does not receive the feedback until the sub-frame 7. For sub-frames 0 to 6, the eNB uses the last frame's (frame n−1) feedback information to schedule radio resource used for the transmission of the UE, for example transmission rate adaptation, etc. So the feedback information and the result of scheduling, i.e. precoding information in each sub-carrier/sub-band, do not match in these sub-frames. Thus the unreliable feedback problem still exists.

Therefore, there is a need for a scheduling scheme of downlink transmission in a wireless communication system, which can further mitigate such unreliable feedback effect.

SUMMARY OF THE INVENTION

To solve the problems in the prior art, one or more method and apparatus embodiments according to the present invention aim to make inter-cell interference more stable over sub-frames during the downlink transmission of the wireless communication system, and thus reduce unreliability of UEs' feedback information.

According to an aspect of the present invention, an embodiment of the present invention provides a method for scheduling downlink transmission in a wireless communication system, comprising: a) scheduling, in a channel measurement sub-frame, user equipments in a cell according to feedback information that was most recently received from the user equipments, wherein in the channel measurement sub-frame, the user equipments calculate feedback information to be reported; and b) scheduling, in response to receipt of the feedback information, the user equipments based on a result of scheduling corresponding to the channel measurement sub-frame.

According to another aspect of the present invention, an embodiment of the present invention provides a scheduling apparatus for scheduling downlink transmission in a wireless communication system, comprising: means for scheduling, in a channel measurement sub-frame, user equipments in a cell according to feedback information that was most recently received from the user equipments, wherein in the channel measurement sub-frame, the user equipments calculate feedback information to be reported; and means for scheduling, in response to receipt of the feedback information, the user equipments based on a result of scheduling corresponding to the channel measurement sub-frame.

According to further aspect of the present invention, an embodiment of the present invention provides a computer program product embodied in a computer readable medium the execution of which by a data processor of a node comprises operations of: a) scheduling, in a channel measurement sub-frame, user equipments in a cell according to feedback information that was most recently received from the user equipments, wherein in the channel measurement sub-frame, the user equipments calculate feedback information to be reported; and b) scheduling, in response to receipt of the feedback information, the user equipments based on a result of scheduling corresponding to the channel measurement sub-frame.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION OF THE PREFERRED EMBODIMENT

Hereinafter, embodiments of the present invention will be described with reference to the accompanying drawings. In the following description, many specific details are illustrated so as to understand the present invention more comprehensively. However, it is apparent to the skilled in the art that implementation of the present invention may not have these details. Additionally, it should be understood that the present invention is not limited to the particular embodiments as introduced here. On the contrary, any arbitrary combination of the following features and elements may be considered to implement and practice the present invention, regardless of whether they involve different embodiments. Thus, the following aspects, features, embodiments and advantages are only for illustrative purposes, and should not be understood as elements or limitations of the appended claims, unless otherwise explicitly specified in the claims.

Figure 2:
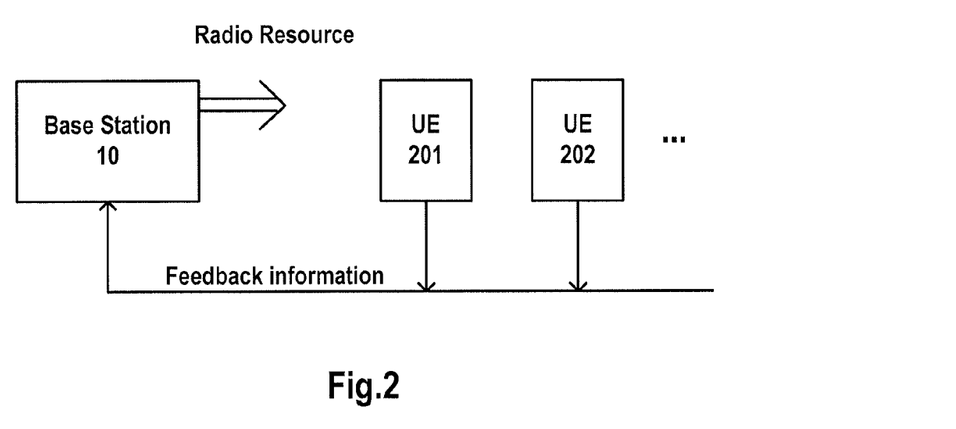
FIG. 2 shows a wireless communication system in which an embodiment of the present invention can be implemented.

FIG. 2 shows a wireless communication system in which an embodiment of the present invention can be implemented.

As shown in FIG. 2, a base station 10 provides service to a plurality of UEs (as examples, only UEs 101, 102 shown) in its cell. The base station 10 allocates radio resources to the UEs 101, 102 based at least on feedback information from the UEs, which are calculated and reported regularly by the UEs. Accordingly, the UEs 101, 102 communicate with the base station 10 over the radio resource allocated by the base station 10.

The base station 10 may be configured to operate in a wireless communication network that implements the Third Generation Partnership (3GPP) standard for Long Term Evolution (LTE), which is referred to as eNB in the LTE/LTE-A system. Of course, that is a non-limiting example, and various embodiments of teachings herein apply essentially to any wireless communication network that employs resource allocation based at least on feedback from UEs.

As being described in the above, the feedback information lacks, when received by the base station 10 and being as a basis to schedule the UEs, reliability and accuracy. Basically, there are two main factors which affect the reliability and accuracy of the feedback information. Firstly, the channel may be a time-varying channel, for example, Doppler shift caused by UE's moving could make the wireless channel change over time. Secondly, the inter-cell interference, which is associated with the radio resource (e.g., sub-carriers or sub-bands) allocation with each UE in the cell, may have changed when the feedback information calculated and reported by the UEs is available at the base station 10 after delays due to transmission and processing at both sides. For example, in sub-frame 0, the UE calculates its feedback information based on the intra-cell signal strength and the inter-cell interference at that time. Thanks to the scheduling algorithm in each sub-frame employed by the base station 10, the inter-cell interference would be changed among the sub-frames shown in FIG. 1. So, when the UE's feedback is available at the base station 10 at sub-frame 7, the feedback information is unreliable and inaccurate due to the change of inter-cell interference.

The inventors of the present invention have conceived that unreliability and inaccuracy of the feedback information can be effectively mitigated by employing an appropriate scheduling scheme of downlink transmission in the base station 10.

Specifically, when the delayed feedback information is received by the base station 10, the base station 10 uses the result of scheduling that was used to schedule the UEs at the time the feedback information was calculated by the UEs, to schedule the UEs in the cell. Thereby, the inter-cell interference is much more stable during the scheduling procedure, thus unreliability and inaccuracy of the feedback information can be effectively mitigated.

Figure 3:
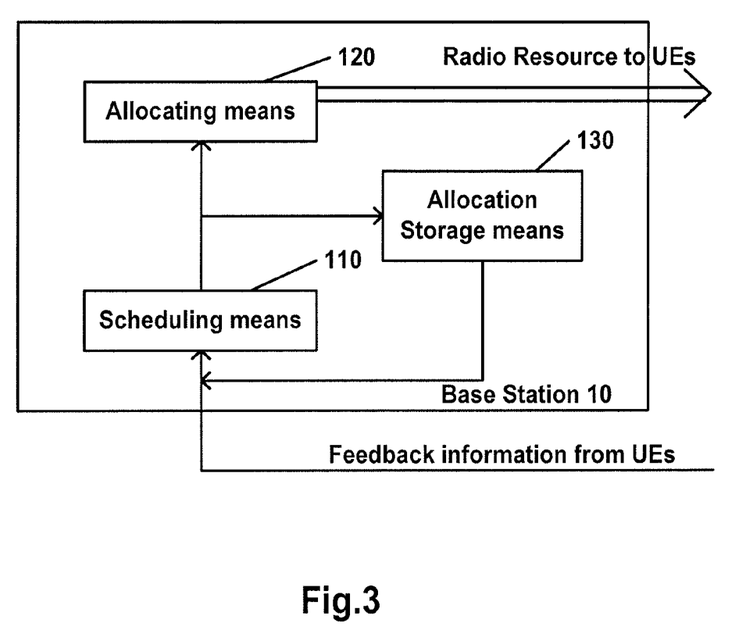
FIG. 3 schematically shows a block diagram of a base station according to an embodiment of the present invention.

FIG. 3 schematically shows a block diagram of a base station according to an embodiment of the present invention.

As shown in FIG. 3, reference number 10 denotes a base station according to an embodiment of the present invention, for example, the base station 10 in the wireless communication of FIG. 1. The base station 10 comprises scheduling means 110 for applying some scheduling scheme/algorithms to generate a result of scheduling associated with the plurality of UEs in order to optimize a set of performance metrics; allocating means 120 for allocating radio resource to the UEs based on the result of scheduling generated from the scheduling means 110; and allocation storage means 130 for storing the result of scheduling corresponding to the channel measurement sub-frames.

In the base station 10, the goal of the scheduling means 110 is to apply some scheduling algorithms to allocating the time/frequency/spatial resource to multiple UEs based on the feedback information from the UEs in order to optimize a set of performance metrics, for example average throughput/delay/fairness. As an example, proportional fairness is one of the popular algorithms and is adopted as the default working scheduling algorithm in the 3GPP LTE performance evaluation. The PF scheduling algorithm is defined that the UE with the highest ratio M out of all the UEs will receive the transmission opportunity in the next sub-frame/sub-band, wherein $$M = \text{Max}\left(\frac{R_{current}}{R_{history}}\right)$$

where $R_{current}$ is a UE's instantaneous rate at the scheduling moment. It is decided by the feedback CQI according to the link adaptation function; and $R_{history}$ is the UE's history average throughput over some time intervals/sub-bands.

Optionally, according to an implementation of the embodiment of the present invention, the scheduling means 110 can be configured to maintain a sub-carrier allocation table for representing the result of scheduling corresponding to non-channel-measurement sub-frames, which is to be provided to the allocating means 120 that then allocates radio resource accordingly to the UEs in the cell. Depending on whether the feedback is available in the base station, the sub-carrier allocation table can be updated with the new result of scheduling. Based on the updated sub-carrier allocation table, the scheduling means 110 could schedule the sub-carriers/sub-bands to the UE which has the same/similar PMI as the UE indicated by the sub-carrier allocation table. And such allocation could be performed based on proportional fairness or other metrics.

When the radio resource (time/frequency/spatial resource) has been scheduled to multiple UEs, the allocating means 120 will map the UEs' data to the corresponding radio resource. The allocation of radio resource by the allocating means 120 is performed with respect to each sub-frame based on the result of scheduling determined by the scheduling means 110.

According to the embodiment of the present invention, the allocation storage means 130 is introduced to the base station 10. In a channel measurement sub-frame, for example the sub-frame 0 or 5, the base station 10 will schedule UEs based on UEs' feedback information which was received most recently by the base station 10. Then, in addition to being provided to the allocating means 120 for resource allocation, the result of scheduling corresponding to the channel measurement sub-frame is further stored in the allocation storage means 130 for later use.

As discussed above, the feedback information that was calculated by the UEs in that channel measurement sub-frame is received at the base station 10 with some delay, for example, 6 ms. Upon receipt of the feedback information, at the current sub-frame, the scheduling mean 110 uses the result of scheduling that is stored in the allocation storage means 130, to schedule the UEs in the cell. Optionally, the scheduling means 110 may update the sub-carrier allocation table with the result of scheduling stored in the allocation storage means 130.

Figure 4:
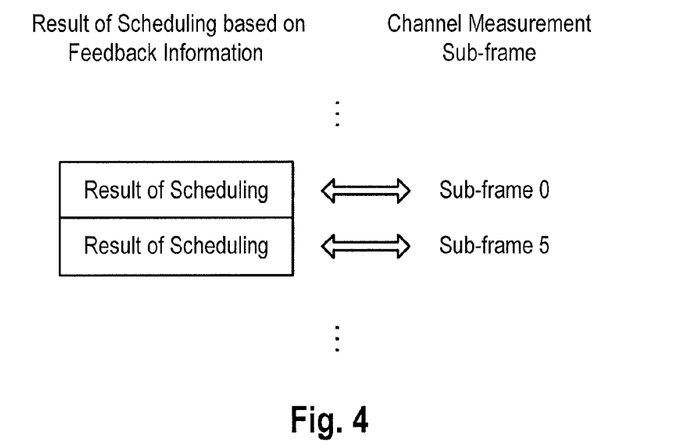
FIG. 4 schematically shows an exemplary implementation of the allocation storage means in a base station according to an embodiment of the present invention.
Figure 5:
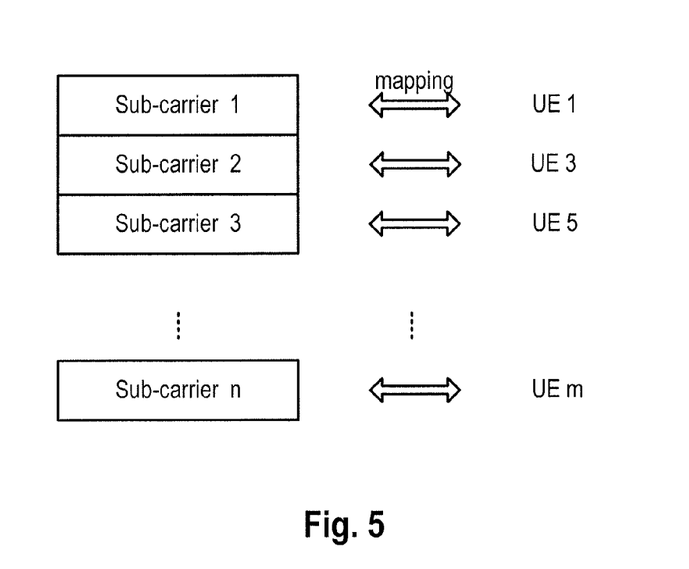
FIG. 5 schematically shows a result of scheduling stored in an allocation storage means of a base station according to an embodiment of the present invention.

According to an embodiment of the present invention, the allocation storage means 130 can be embodied as a block of memory. FIG. 4 schematically shows an exemplary implementation of the allocation storage means 130 in the base station 10 according to an embodiment of the present invention. As shown in FIG. 4, with respect to a channel measurement sub-frame being scheduled, a corresponding result of scheduling, which is generated by the scheduling means 110 based on the feedback information as previously received from the UEs, is stored. A result of scheduling is a mapping table between the radio resource (e.g., sub-carrier) and the UE's identification. FIG. 5 schematically shows an exemplary result of scheduling stored in the allocation storage means 130 of the base station 10 according to an embodiment of the present invention. As shown in FIG. 5, in a result of scheduling, each sub-carrier of all sub-carriers employed in the system is mapped to a particular UE to be scheduled.

It should be appreciated that FIGS. 4 and 5 only provide an exemplary implementation for the data structure of the allocation storage means 130 and should not be interpreted as a limitation to the present invention. Those skilled in the art may adapt the implementation of the allocation storage means 130 to specific application scenarios. However, such adaptation or modification will not depart from the concept of the present invention.

Figure 6:
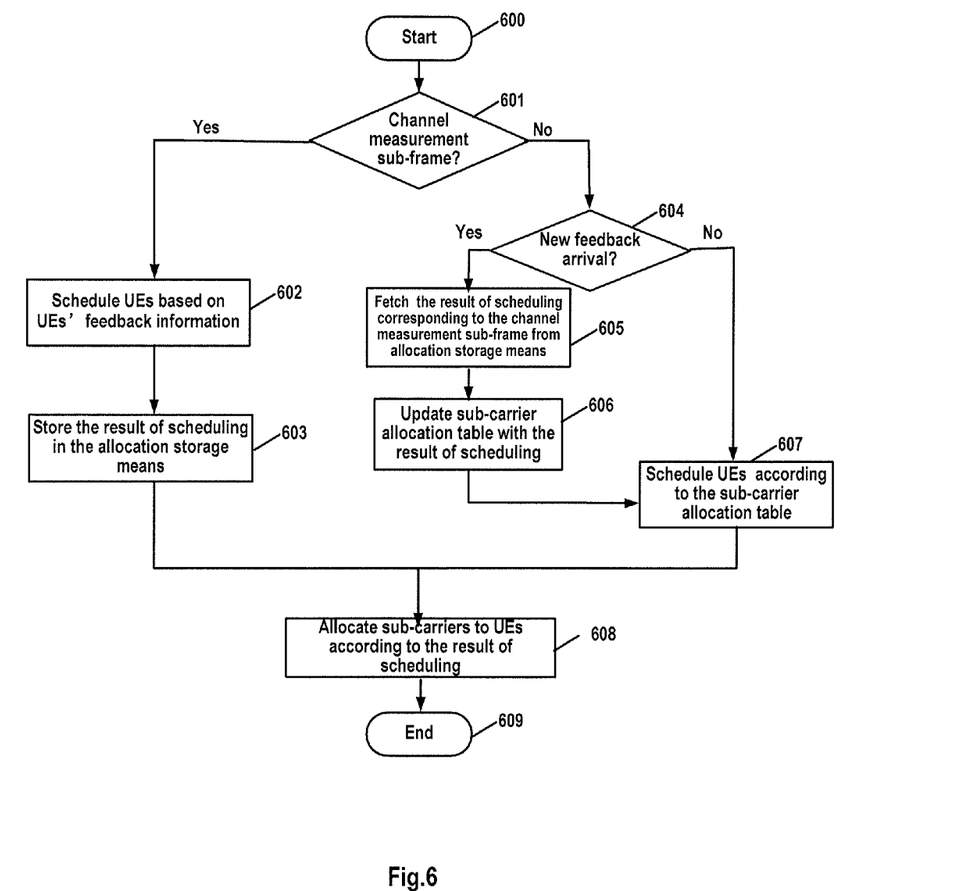
FIG. 6 shows a flow chart of the processing in a base station according to an embodiment of the present invention.

FIG. 6 shows a flow chart of processing in a base station according to an embodiment of the present invention.

At step 600, the processing flow starts.

At step 601, it is determined whether the current sub-frame is a channel measurement sub-frame. In a radio frame of the LTE/LTE-A system as shown in FIG. 1, a channel measurement sub-frame can be sub-frame 0 or 5, in which the UE calculates feedback information according to reference signals or data symbols downlink transmitted by the base station.

In fact, in each sub-frame, the scheduling means 110 as shown in FIG. 3 uses the scheduling algorithm, e.g. PF scheduling algorithm, to schedule the radio resource to multiple UEs. The scheduling means 110 has the knowledge of specific transmission timing since each UE in the cell is synchronized with the base station 10. Thus, it is easy for the scheduling means 110 to determine whether it is the time for a channel measurement sub-frame.

If the determination result at step 601 is positive, then the processing flow proceeds to step 602; if the determination result at step 601 is negative, then, the processing flow proceeds to step 604.

If the current sub-frame is a channel measurement sub-frame, at step 602, then the radio resource is scheduled, for example, by the scheduling means 110, to the UEs in the cell based on the UE's feedback information, e.g. PMI, CQI, etc, which was received most recently by the base station. That is to say, a new result of scheduling corresponding to the channel measurement sub-frame is generated by the scheduling means 110 based on the feedback information.

At step 603, in addition to being provided to the allocating means 120 for allocation, the result of scheduling corresponding to the channel measurement sub-frame is stored, for example, in the allocation storage means 130 as shown in FIG. 3. The result of scheduling may be a mapping table between the radio resource (e.g., sub-carrier/sub-band) and the UE's identification as illustrated in FIG. 5.

Then, the processing flow proceeds to step 608. At step 608, the sub-carriers/sub-bands are allocated, for example, by the allocating means 120, to the multiple UEs based on the result of scheduling corresponding to the channel measurement sub-frame.

If the current sub-frame is a non-channel-measurement sub-frame, then at step 604, it is determined whether the UEs' feedback information is received in the current sub-frame.

If the determination result at step 604 is positive, then the processing flow proceeds to step 605; if the determination result at step 604 is negative, then, the processing flow proceeds to step 607 directly.

If the UEs' feedback information has arrived at the base station 10 in the current sub-frame, then at step 605, the result of scheduling corresponding to the channel measurement sub-frame stored in the allocation storage means is fetched by the scheduling means 110, in which channel measurement sub-frame the received feedback information was calculated by the UEs.

Optionally, according to an implementation of the embodiment of the present invention, at step 606, the scheduling means 110 may update the sub-carrier allocation table maintained in the scheduling means 110 according to the result of scheduling fetched from the allocation storage means 130. The sub-carrier allocation table in the scheduling means 110 generally represents the result of scheduling to be provided to the allocating means 120 as a basis of actual sub-carrier allocation in non-channel-measurement sub-frames.

Figure 7:
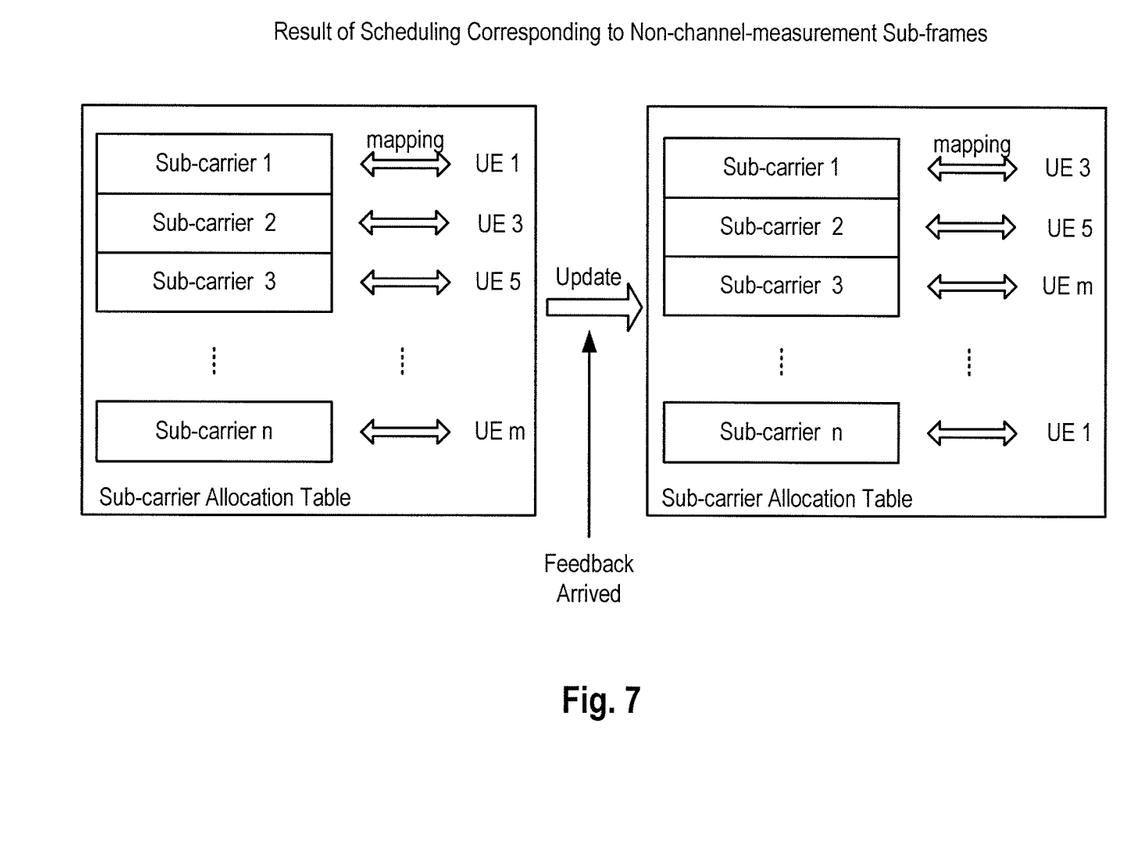
FIG. 7 schematically shows an exemplary update processing of the sub-carrier allocation table according to an implementation of the embodiment of the present invention.

FIG. 7 schematically shows an exemplary update processing of the sub-carrier allocation table according to an implementation of the embodiment of the present invention. As shown in FIG. 7, the structure of the sub-carrier allocation table may be configured to be the same as the one shown in FIG. 5. The sub-carrier allocation table in the scheduling means 110 stores the result of scheduling corresponding to non-channel-measurement sub-frames. When the new feedback information is arrived in the current sub-frame, the sub-carrier allocation table will be updated with the result of scheduling fetched from the allocation storage means 130. The result of scheduling stored in the sub-carrier allocation table will be provided to the allocating means 120 as a basis of actual sub-carrier allocation in non-channel-measurement sub-frames.

At step 607, the UEs are scheduled according to the sub-carrier allocation table, which will be provided to the allocation means 120 for radio resource allocation.

If the new feedback is not available in the current sub-frame, then the processing flow directly proceeds to step 607, where no update is performed to the sub-carrier allocation table and the scheduling means 110 schedules the sub-carriers/sub-bands to the UE according to the current sub-carrier allocation table.

Then, the processing flow proceeds to step 608. At step 608, the sub-carriers/sub-bands are allocated, for example, by the allocating means 120, to the multiple UEs based on the result of scheduling represented in the sub-carrier allocation table.

At step 609, the processing flow ends.

It can be seen from the flow chart of FIG. 6 that the result of scheduling corresponding to a channel measurement sub-frame is stored, in addition to being used as a basis of radio resource allocation for the channel measurement sub-frame. When the delayed feedback information is received by the base station 10, the base station 10 fetches the stored result of scheduling that was used to schedule the UEs at the time the feedback information was calculated by the UEs, so as to schedule the UEs in the cell. Thereby, the inter-cell interference is much more stable during the scheduling procedure and thus unreliability and inaccuracy of the feedback information can be effectively mitigated.

Figure 8:
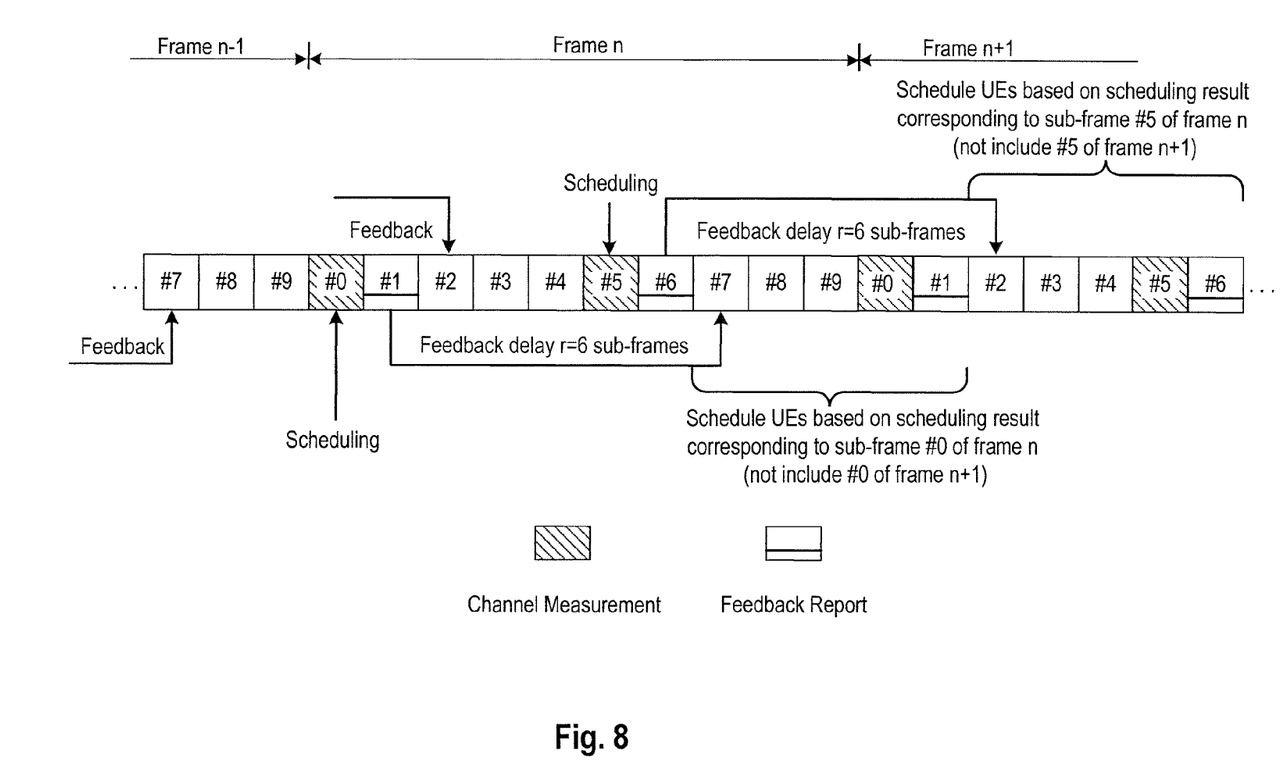
FIG. 8 schematically shows an example of a scheduling time sequence according to an embodiment of the present invention.

FIG. 8 schematically shows an example of a scheduling time sequence according to an embodiment of the present invention.

As illustrated in FIG. 8, there is a structure of typical LTE Frequency Division Duplexing (FDD) downlink frames.

At the sub-frames 0 and 5, UEs in the cell perform channel measurement and calculate the feedback information, e.g., PMI and CQI.

In the sub-frames 1 and 6, the UEs send the feedback information calculated respectively in the channel measurement sub-frames 0 and 5 to the base station. Due to transmission and processing delays, the feedback information has 6 ms delay when received by the base station. For example, the feedback information that was calculated in the sub-frame 0, is received by the base station in the sub-frame 7; and the feedback information that was calculated in the sub-frame 5, is received by the base station in the sub-frame 2 of the next FDD frame (frame n+1).

Also, in each of the channel measurement sub-frames (i.e., the sub-frames 0 and 5), the scheduling means of the base station schedules UEs in the cell based on UEs' feedback information that was received most recently, and stores the result of scheduling in the allocation storage means in addition to being used as a basis for allocation. For example, in the sub-frame 0 of the frame n, the scheduling means determines (601) that the current sub-frame is a channel measurement sub-frame. The scheduling means of the base station schedules (602) the UEs in the cell based on UEs' feedback information that was received in the sub-frame 7 in the frame n−1. The result of scheduling based on the feedback information received in the sub-frame 7 of the frame n−1 is stored (603) in the allocation storage means for later use.

After 6 ms delay, i.e., at the sub-frame 7 of the frame n, the base station receives the delayed feedback information which was calculated by the UEs in the sub-frame 0 of the frame n. In responsive to the scheduling means determining (604) that the UEs' feedback information is received in the current sub-frame, the scheduling means of the base station fetches (605) the result of scheduling corresponding to the sub-frame 0 of the frame n from the allocation storage means and updates (606) the sub-carrier allocation table accordingly.

From the sub-frames 7 to 9 of the frame n and the sub-frame 1 of the frame n+1 (excluding the sub-frame 0 of the frame n+1), the scheduling means of the base station schedules (607) sub-carriers/sub-bands to the UEs according to the sub-carrier allocation table. The allocation could be based on the proportional fairness algorithms under the constraint that the scheduled UE must have the same or similar PMI/CQI as the UE mapped to the sub-carrier/sub-bands of the sub-carrier allocation table. It should be noted that the sub-frame 0 of the frame n+1 is excluded from the above-described scheduling logic, because in that channel measurement sub-frame, the scheduling means of the base station will schedule the UEs based on the feedback information most recently received in the sub-frame 7 of the frame n.

Similarly, in the sub-frame 5 of the frame n, the scheduling means determines (601) that the current sub-frame is a channel measurement sub-frame. The scheduling means of the base station schedules (602) the UEs in the cell based on UEs' feedback information that was received in the sub-frame 2 in the frame n. The result of scheduling based on the feedback information received in the sub-frame 2 of the frame n is stored (603) in the allocation storage means for later use.

At the sub-frame 2 of the frame n+1, the base station receives delayed feedback information which was calculated by the UEs in the channel measurement sub-frame 5 of the frame n. In responsive to the scheduling means determining (604) that the UEs' feedback information is received in the current sub-frame, the scheduling means of the base station fetches (605) the result of scheduling corresponding to the sub-frame 5 of the frame n from the allocation storage means and updates (606) the sub-carrier allocation table accordingly.

From the sub-frames 2 to 4 of the frame n+1 and the sub-frame 6 of the frame n+1 (excluding the sub-frame 5 of the frame n+1), the scheduling means of the base station schedules (607) sub-carriers/sub-bands to the UEs according to the sub-carrier allocation table.

Those skilled in the art may appreciate from the above description that after the scheduling processing according to the embodiment of the present invention, the feedback information from the UEs in the cell is reliable for all the sub-frames in the aspect of inter-cell interference, except for the channel measurement sub-frames. Thus, the embodiments of present invention can improve the accuracy of the feedback information and effectively mitigate the unreliability of UEs' feedback information.

A scheduling processing in a base station according to an embodiment of the present invention has been depicted in detail with reference to FIGS. 6 and 8. It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction. For example, in some embodiments, the above one or more optional steps may be omitted. Specific embodiment of each step may be different from the depiction. All these variations fall within the spirit and scope of the present invention.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. As well known in the art, the design of integrated circuits is by and large a highly automated process.

The present invention may also be embodied in the computer program product which comprises all features capable of implementing the method as depicted herein and may implement the method when loaded to the computer system.

The present invention has been specifically illustrated and explained with reference to the preferred embodiments. The skilled in the art should understand various changes thereto in form and details may be made without departing from the spirit and scope of the present invention.

What is claimed is:

1. A method for scheduling downlink transmission in a wireless communication system, comprising:
   a) scheduling, by a hardware processor, in a channel measurement sub-frame, user equipments in a cell according to feedback information that was most recently received from said user equipments, wherein in said channel measurement sub-frame, the user equipments calculate feedback information to be reported; and
   b) scheduling, by the hardware processor, in response to receipt of said feedback information, said user equipments based on a result of scheduling corresponding to said channel measurement sub-frame.

2. The method according to claim 1, further comprising:
   storing said result of scheduling corresponding to said channel measurement sub-frame after the step a).

3. The method according to claim 2, wherein step b) further comprises:
   fetching the stored result of scheduling;
   updating a sub-carrier allocation table according to the fetched result of scheduling, wherein said sub-carrier allocation table represents a result of scheduling corresponding to non-channel-measurement sub-frames.

4. The method according to claim 3, further comprising:
   scheduling, in said non-channel-measurement sub-frames, said user equipments based on the result of scheduling represented in said sub-carrier allocation table.

5. The method according to claim 1, wherein:
   a result of scheduling is a mapping table between the radio resource and identification of at least one of said user equipments.

6. The method according to claim 1, wherein:
   said wireless communication system implements the Third Generation Partnership standard for Long Term Evolution.

7. The method according to claim 6, wherein:
   said channel measurement sub-frame and said non-channel-measurement sub-frames conform with a structure of Long Term Evolution (LTE) Frequency Division Duplexing downlink frame.

8. A scheduling apparatus for scheduling downlink transmission in a wireless communication system, comprising:
   means for scheduling, in a channel measurement sub-frame, user equipments in a cell according to feedback information that was most recently received from said user equipments, wherein in said channel measurement sub-frame, the user equipments calculate feedback information to be reported; and
   means for scheduling, in response to receipt of said feedback information, said user equipments based on a result of scheduling corresponding to said channel measurement sub-frame.

9. The scheduling apparatus according to claim 8, further comprising:
   means for causing said result of scheduling corresponding to said channel measurement sub-frame to be stored.

10. The scheduling apparatus according to claim 9, wherein means for scheduling in response to receipt of said feedback information further comprises:

means for fetching the stored result of scheduling;

means for updating a sub-carrier allocation table according to the fetched result of scheduling, wherein said sub-carrier allocation table represents a result of scheduling corresponding to non-channel-measurement sub-frames.

11. The scheduling apparatus according to claim 10, further comprising:

means for scheduling, in said non-channel-measurement sub-frames, said user equipments based on the result of scheduling represented in said sub-carrier allocation table.

12. The scheduling apparatus according to claim 8, wherein:

a result of scheduling is a mapping table between the radio resource and identification of at least one of said user equipments.

13. The scheduling apparatus according to claim 8, wherein:

said wireless communication system implements the Third Generation Partnership standard for Long Term Evolution.

14. The scheduling apparatus according to claim 13, wherein:

said channel measurement sub-frame and said non-channel-measurement sub-frames conform with a structure of Long Term Evolution (LTE) Frequency Division Duplexing downlink frame.

15. A base station device comprising:

a scheduling apparatus for scheduling downlink transmission in a wireless communication system, the scheduling apparatus comprising:

means for scheduling, in a channel measurement sub-frame, user equipments in a cell according to feedback information that was most recently received from said user equipments, wherein in said channel measurement sub-frame, the user equipments calculate feedback information to be reported; and means for scheduling, in response to receipt of said feedback information, said user equipments based on a result of scheduling corresponding to said channel measurement sub-frame.

16. The base station device according to claim 15, further comprising:

allocation storage means for storing said result of scheduling corresponding to said channel measurement sub-frame.

\* \* \* \* \*